(12) United States Patent
Pho et al.

(10) Patent No.: US 12,012,840 B2
(45) Date of Patent: Jun. 18, 2024

(54) TECHNIQUES FOR CALIBRATING BOREHOLE PROPAGATION MODEL FOR DIRECTION DRILLING IN REAL TIME

(71) Applicant: Halliburton Energy Services, Inc., Houston, TX (US)

(72) Inventors: Vy Pho, Houston, TX (US); Nazli Demirer, Houston, TX (US); Umut Zalluhoglu, Houston, TX (US); Robert P. Darbe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 126 days.

(21) Appl. No.: 17/564,578

(22) Filed: Dec. 29, 2021

(65) Prior Publication Data
US 2023/0203931 A1    Jun. 29, 2023

(51) Int. Cl.
*E21B 44/00*    (2006.01)
*E21B 7/04*    (2006.01)
(Continued)

(52) U.S. Cl.
CPC ............ *E21B 44/00* (2013.01); *E21B 7/04* (2013.01); *G01V 20/00* (2024.01); *G06N 5/022* (2013.01);
(Continued)

(58) Field of Classification Search
CPC ........ E21B 44/00; E21B 7/04; E21B 2200/20; E21B 33/00; G01V 99/005
See application file for complete search history.

(56) References Cited

U.S. PATENT DOCUMENTS

| 8,676,558 B2 | 3/2014 | Pirovolou |
| 11,408,268 B2 * | 8/2022 | Zalluhoglu ............. E21B 44/00 |

(Continued)

FOREIGN PATENT DOCUMENTS

WO    2019132929 A1    7/2019

OTHER PUBLICATIONS

Pehlivanturk, et al.; "Slide Drilling Guidance System for Directional Drilling Path Optimization"; Society of Petroleum Engineers/IADC International Drilling Conference and Exhibition; Mar. 5-7, 2019; 13 pgs.
(Continued)

*Primary Examiner* — Catherine Loikith
(74) *Attorney, Agent, or Firm* — Benjamin Ford; Parker Justiss, P.C.

(57) ABSTRACT

Current disclosure proposes calibration methodology that uses the knowledge learned from historical data and real-time data to update a simplified physics-based borehole propagation model for real time steering control of a directional drilling system. The proposed methodology updates model parameters of the simplified physics-based model in real time through a process of setting up and optimizing an objective function, which indicates the difference between the estimated trajectory and the feedback from the real-time data. Penalizing terms, which prevent the parameters from deviating drastically from the prior knowledge of the parameter, and various components of the objective function are learned from the historical data. As a result, the updated model can accurately estimate and predict the system behavior allowing an input sequence of the system to be accurately mapped to the output response.

20 Claims, 9 Drawing Sheets

(51) Int. Cl.
  *G01V 20/00* (2024.01)
  *G06N 5/022* (2023.01)
  *E21B 47/022* (2012.01)

(52) U.S. Cl.
  CPC ......... *E21B 47/022* (2013.01); *E21B 2200/20* (2020.05)

(56) References Cited

U.S. PATENT DOCUMENTS

| | | | |
|---|---|---|---|
| 11,674,353 B2 * | 6/2023 | Zalluhoglu | E21B 7/10 |
| | | | 702/9 |
| 2015/0330209 A1 * | 11/2015 | Panchal | G05B 13/042 |
| | | | 700/275 |
| 2017/0211372 A1 * | 7/2017 | Samuel | E21B 47/022 |
| 2018/0051552 A1 * | 2/2018 | Li | E21B 47/024 |
| 2020/0072034 A1 | 3/2020 | Zalluhoglu et al. | |
| 2020/0095860 A1 | 3/2020 | Zalluhoglu et al. | |
| 2020/0408084 A1 | 12/2020 | Gu et al. | |
| 2021/0103843 A1 | 4/2021 | Keller et al. | |
| 2022/0290550 A1 * | 9/2022 | Ba | E21B 44/00 |

OTHER PUBLICATIONS

D'Angelo, et al.; "Guidance for Calibration of a Directional Drilling Wellbore Propagation Model Using Field Data"; IADC/Society of Petroleum Engineers International Drilling Conference and Exhibition; Mar. 3-5, 2020; 13 pgs.

Pehlivanturk, et al.; "Path advisory for slide drilling using a non-linear wellbore propagation model and genetic algorithm"; Journal of Petroleum Science and Engineering; 2019; 8 pgs.

* cited by examiner

TECHNIQUES FOR CALIBRATING BOREHOLE PROPAGATION MODEL FOR DIRECTION DRILLING IN REAL TIME

BACKGROUND

In recent years, demand for autonomous directional drilling has increased rapidly due to its cost effectiveness and high accuracy in borehole placement. The increasing demand for autonomous directional drilling has led to development of various borehole propagation models with different complexities that can predict the trajectories and drilling tool performance given a bottomhole assembly (BHA) configuration and steering inputs.

SUMMARY

In one aspect of the current disclosure, a method for directional drilling is provided. The method includes: calibrating a borehole propagation model (BPM) by estimating a value of at least one parameter of the BPM in real time based on historical data and real time sensor measurements; wherein said estimating includes optimizing an objective function that describes a difference between a trajectory estimated from the BPM and the real time sensor measurements and a deviation between the value of the at least one parameter and a prior value of the at least one parameter determined based on the historical data.

In another aspect of the current disclosure, a system for directional drilling is provided. The system includes: an interface that receives historical data and real time sensor measurements; and a processor that calibrates a borehole propagation model (BPM) by estimating a value of at least one parameter of the BPM in real time based on the historical data and the real time sensor measurements. Aforementioned estimating includes optimizing an objective function that describes a difference between a trajectory estimated from the BPM and the real time sensor measurements and a deviation between the value of the at least one parameter and a prior value of the at least one parameter determined based on the historical data.

In yet another aspect of the current disclosure, a computer program product having a series of operating instructions stored on a non-transitory computer-readable medium is provided. The computer program product directs a data processing apparatus when executed thereby to: calibrate a borehole propagation model (BPM) by estimating a value of at least one parameter of the BPM in real time based on historical data and real time sensor measurements; wherein said estimating includes optimizing an objective function that describes a difference between a trajectory estimated from the BPM and the real time sensor measurements and a deviation between the value of the at least one parameter and a prior value of the at least one parameter determined based on the historical data.

BRIEF DESCRIPTION

Reference is now made to the following descriptions taken in conjunction with the accompanying drawings, in which.

DETAILED DESCRIPTION

One ongoing challenge is the limited ability to accurately predict the steering behavior of the directional drilling system in real time. As drilling system dynamics vary along the borehole, continually calibrating a borehole propagation model to capture the unknowns of the environment as well as the measurement uncertainties and sensor bias is critical. Continuous calibration enables the directional driller and model-based controller to accurately estimate the current location of the bit as well as to automate proper future steering decisions. Using and calibrating high-fidelity models, as often done in today's drilling operation, has proven to be computationally expensive and not suited for real time control.

Current disclosure addresses these issues by proposing calibration methodology that uses the knowledge learned from historical data and real-time sensor measurements to update a simplified physics-based borehole propagation model for real time steering control of a directional drilling system. The proposed methodology updates model parameters of a simplified physics-based model in real time through a process of setting up and optimizing an objective function, which indicates the difference between the estimated trajectory and the feedback from real-time sensor measurements. Penalizing terms, which prevent the parameters from deviating drastically from the prior knowledge of the parameter, and various components of the objective function are learned from historical data. As a result, the updated model can accurately estimate and predict the system behavior allowing an input sequence of the system to be accurately mapped to the output response.

The proposed methodology is an essential element of the current effort related to automated directional drilling, which aims at faster drilling and more consistent decision making for directional wells. The proposed methodology improves the capabilities of a directional drilling system, whose real-time steering decision cannot be made without an accurate estimation and prediction of system behavior. The proposed methodology for real time steering control in directional drilling is also unique not only in its ability to utilize both real time and historical data for accurately estimating the parameters of the model but also in its ability to do so at low computational cost.

Figure 1:
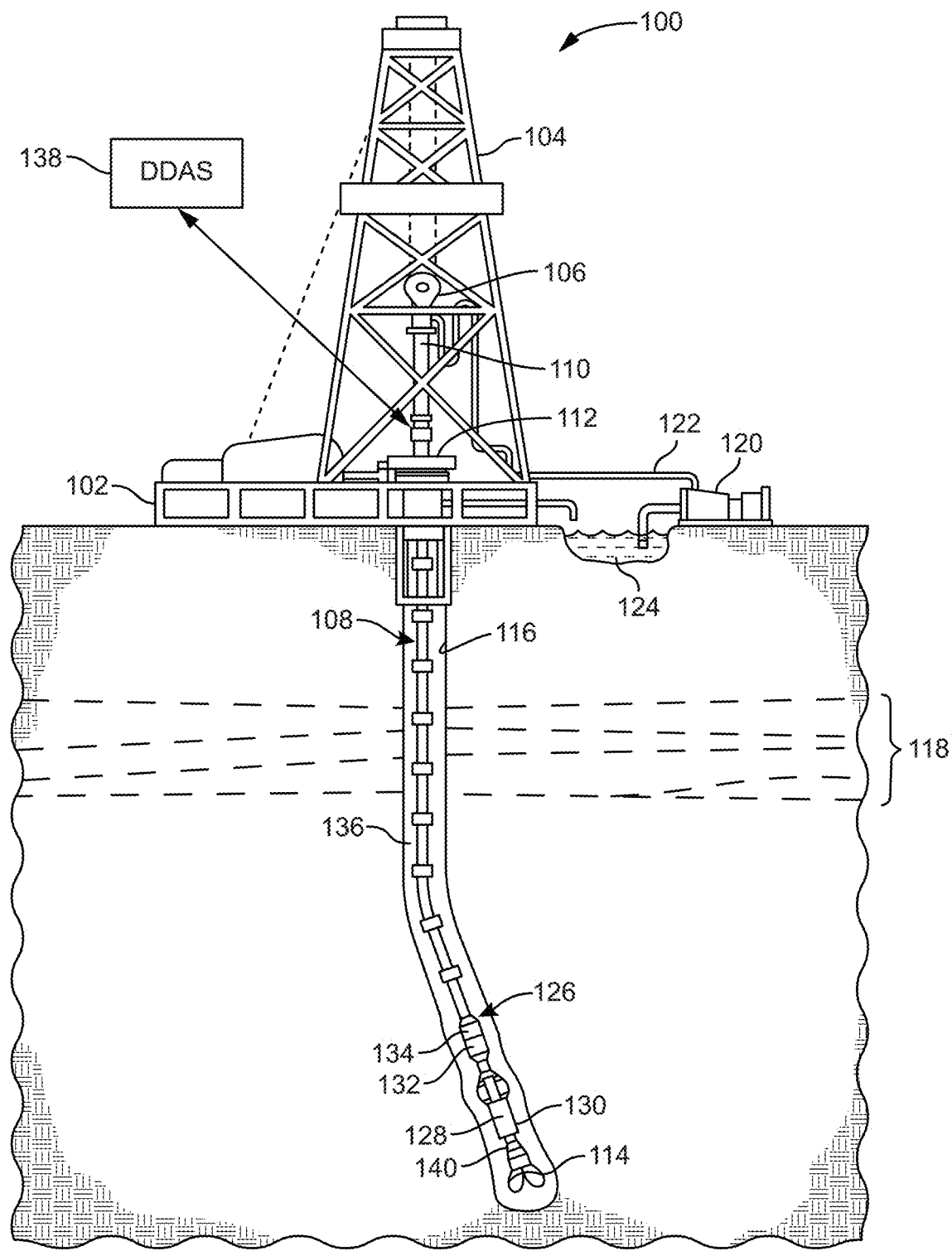
FIG. 1 is an illustration of an example well system for drilling a wellbore.

Turning now to the present figures, FIG. 1 illustrates an example of a well system 100 that is used to direct a drill bit to drill a wellbore within a well, such as a well subsea or on land, according to the proposed methodology. While the system 100 is used for drilling an oil well, the proposed methodology is not limited to such an application and can be applied to drilling natural gas and hydrocarbon wellbores as well as geothermal wellbores intended to provide a source of heat energy instead of hydrocarbons. Simply put, the proposed methodology can be used in any subterranean drilling such as for water wells, extraction of minerals, such as salts or brines, for placement of communications or power cables underground, or for placement of residential gas piping.

Accordingly, FIG. 1 shows BHA 126 disposed in a directional borehole 116. The BHA 126 includes a downhole motor 128, e.g., a rotary steerable system or a mud motor. A drilling platform 102 supports a derrick 104 having a traveling block 106 for raising and lowering a drillstring 108. A kelly 110 supports the drillstring 108 as the drillstring 108 is lowered through a rotary table 112. In some examples, a top drive is used to rotate the drillstring 108 in place of the kelly 110 and the rotary table 112. A drill bit 114 is positioned at the downhole end of the BHA 126, and may be driven by the downhole motor 128 positioned in the BHA 126 and/or rotation of the drillstring 108 from the surface. As the bit 114 rotates, the bit 114 creates the borehole 116 that passes through various formations 118. A pump 120 circulates drilling fluid through a feed pipe 122 and downhole through the interior of drillstring 108, through orifices in drill bit 114, back to the surface via the annulus 136 around drillstring 108, and into a retention pit 124. The drilling fluid transports cuttings from the borehole 116 into the pit 124 and aids in maintaining the integrity of the borehole 116.

The BHA 126 may include one or more logging-while-drilling ("LWD")/measurement-while-drilling ("MWD") tools 132 that collect measurements including survey trajectory data, formation properties and various other drilling conditions as the bit 114 extends the borehole 116 through the formations 118. The LWD/MWD tool 132 may include devices for measuring lithographic information such as formation resistivity and gamma ray intensity, devices for measuring the inclination and azimuth of the BHA 126, pressure sensors for measuring drilling fluid pressure, temperature sensors for measuring borehole temperature, etc.

The BHA 126 may also include a telemetry module 134. The telemetry module 134 receives measurements provided by various downhole sensors, e.g., sensors of the LWD/MWD tool 132, and transmits the measurements to a direction drilling advisory system (DDAS) 138. Similarly, data provided by the DDAS 138 is received by the telemetry module 134 and transmitted to the BHA 126 and its tools, e.g., the LWD/MWD tool 132 and the downhole motor 128. In some examples, mud pulse telemetry, wired drill pipe, acoustic telemetry, or other telemetry technologies known in the art may be used to provide communication between the DDAS 138 and the telemetry module 134.

The downhole motor 128 is configured to change the direction of the BHA 126 and/or the drill bit 114, based on control input, e.g., steering commands, from the DDAS 138. The downhole motor 128 includes a housing 130 disposed about a steerable shaft 140. In this example, the steerable shaft 140 transfers rotation through the downhole motor 128. A deflection or cam assembly surrounding the shaft 140 is rotatable within the rotation resistant housing 130 to orient the deflection or cam assembly such that the shaft 140 can be eccentrically positioned in the borehole causing a change in trajectory. The downhole motor 128 may include or be coupled to directional sensors (e.g., a magnetometer, gyroscope, accelerometer, etc.) for determination of its state, e.g., azimuth and inclination with respect to a reference direction and reference depth. It is understood that the placement of the DDAS 138 is not limited to at or near the surface and may be located down, e.g., within the BHA 126 near the downhole motor 128.

Figure 2:
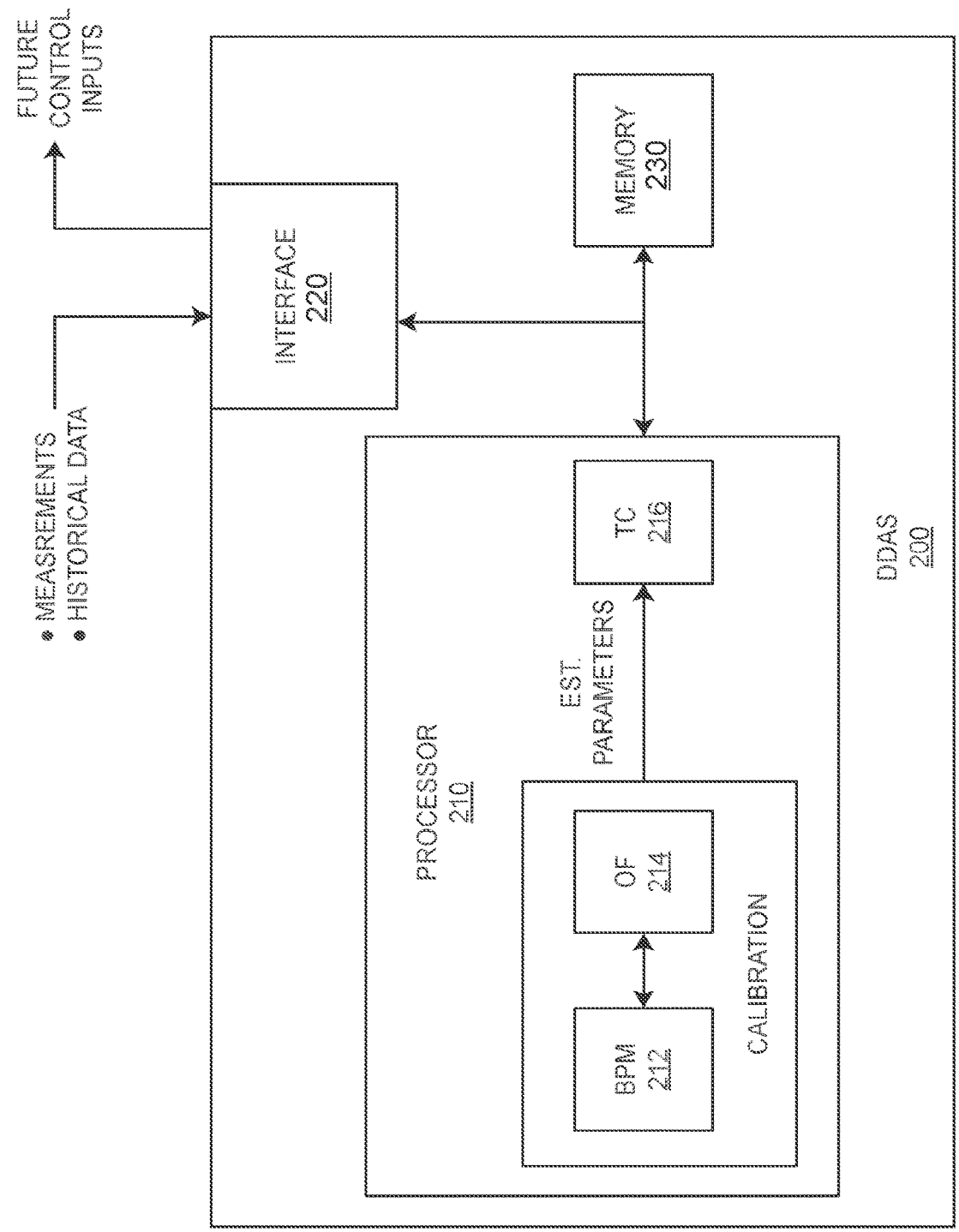
FIG. 2 is a block diagram of an example direction drilling advisory system implemented according to the principles of the current disclosure.

FIG. 2 illustrates a block diagram of an example of a directional drilling advisory system (DDAS) 200, such 138 in FIG. 1 that is implemented according to the principles of the disclosure. The DDAS 200 determines future control inputs or suggestions for a directional drilling system (DDS), such as a mud motor or rotary steerable system, according to one or more algorithms corresponding to 300, 400 and 500 in FIGS. 3, 4A and 5. The DDAS 200 may be located downhole as part of a bottom hole assembly (BHA) or near the surface as part of a surface control unit. In the illustrated example, the DDAS 200 includes a processor 210, an interface 220 and a memory 230 that are communicatively connected to one another using conventional means. It is understood that although not shown, the DDAS 200 may include other components of a conventional BHA or surface control unit.

Figure 3:
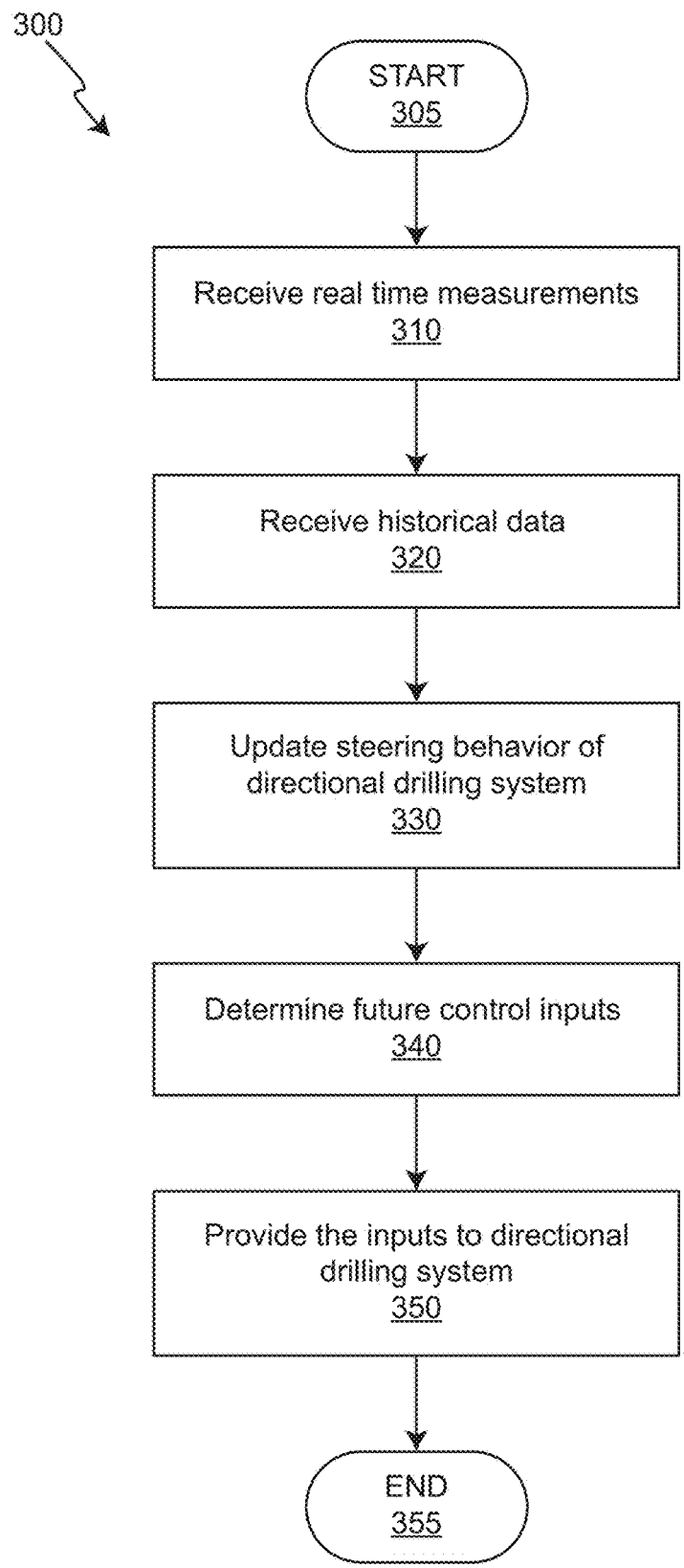
FIG. 3 is a flow diagram of an example method for directional drilling according to the principles of the current disclosure.
Figure 4A:
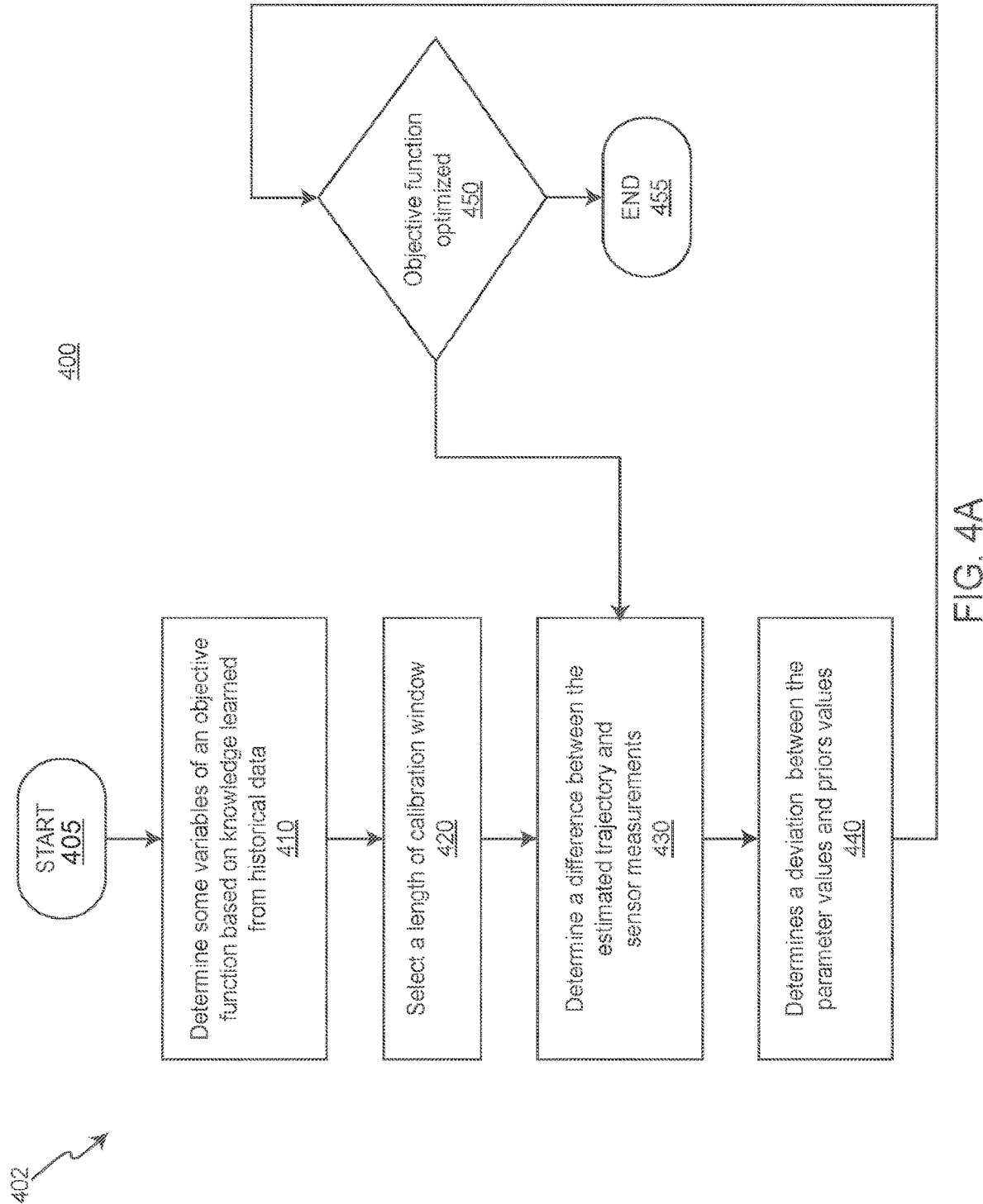
FIGS. 4A and 4B are flow chart and corresponding data flow diagram of an example method for estimating parameter values of a borehole propagation model according to the principles of the current disclosure.
Figure 5:
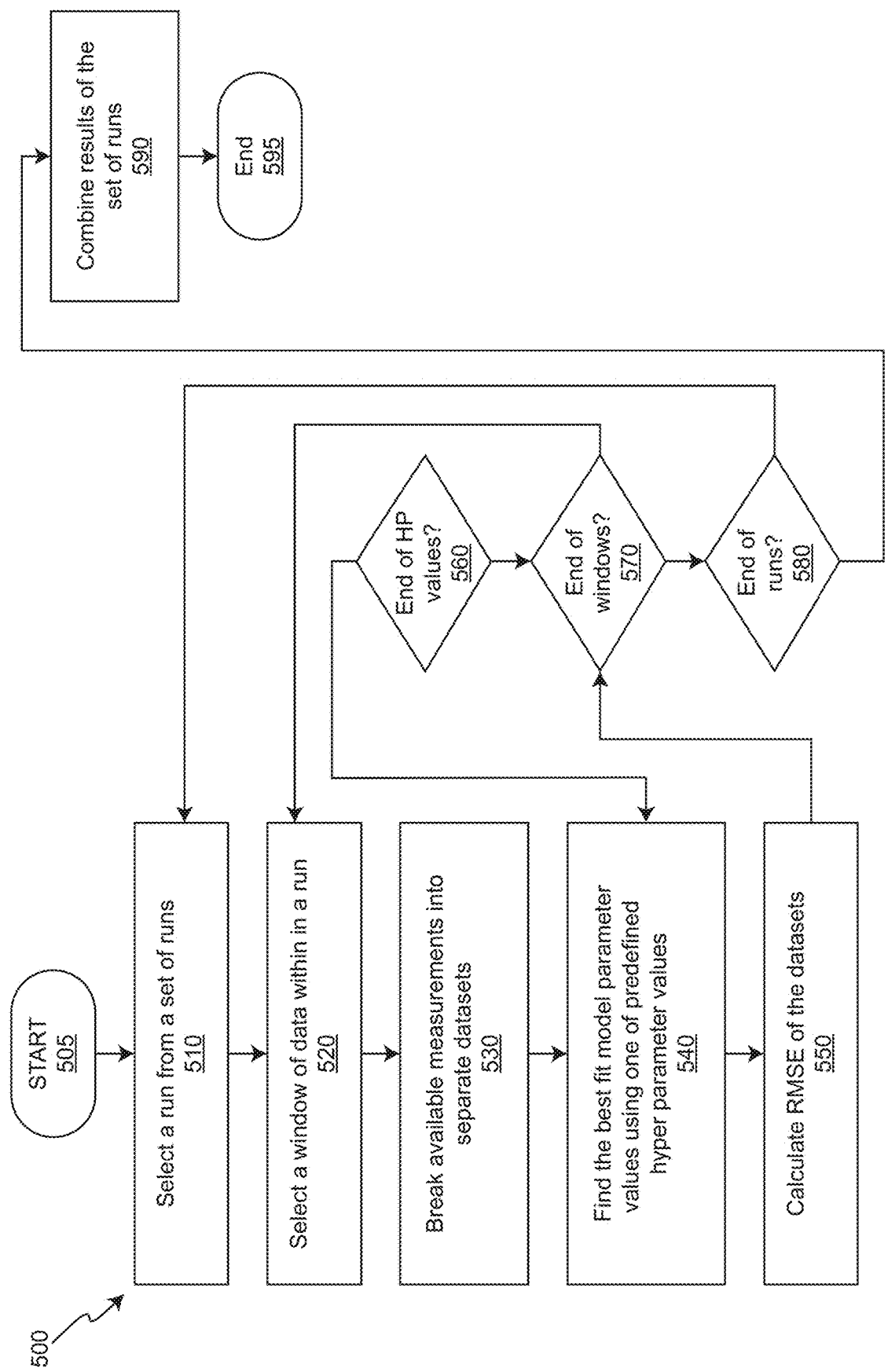
FIG. 5 is a flow diagram of an example method for determining a value of a hyper parameter according to the principles of the current disclosure.

The processor 210 can be configured to operate according to one or more algorithms corresponding to at least some of the steps of the methods 300, 400 and 500 in FIGS. 3, 4A and 5. In the illustrated example, the processor 210, when executed using a series of instructions stored in the memory 230, determines the steering behavior of the DDS by calibrating a borehole propagation model (BPM) 212 that maps the DDS's inputs to an output response in real time. The processor 210 calibrates the BPM 212 by estimating its parameter values, which are estimated by optimizing an objective function (OF) 214 that utilizes both the historical data and the real time measurements. The OF 214 describes the difference between the trajectory estimated from the BPM 212 and the real time sensor measurements and the deviation between the parameters and prior knowledge of the parameters. A trajectory controller (TC) 216 determines the future control inputs for the DDS by using the updated BPM 212 and drilling objectives, such as an intended or planned trajectory of a borehole, constraints, collision risks and etc.

The processor 210 may be any data processing unit, such as a central processing unit, a graphics processing unit, and/or a hardware accelerator. It is understood that the number of processors and the configuration that can be used for the DDAS 200 is not limited as illustrated. For example, multiple processors can be used for the DDAS 200, and any one or combination of the BPM 212, the OF and the TC 216 can be implemented using any of the multiple processors.

The interface 220 receives and transmits data of the DDAS 200. The interface 220 receives real time sensor measurements from various downhole sensors, e.g., sensors of a MWD or LWD tool and/or directional sensors, and historical data from a database or other data storage device, such as the memory 230. The interface 220 forwards the received data to the processor 210 and receives the future control inputs therefrom. The interface 220 transmits the received future control inputs to the DDS. The interface 220 may be implemented using a conventional network interface card (NIC).

Figure 4B:
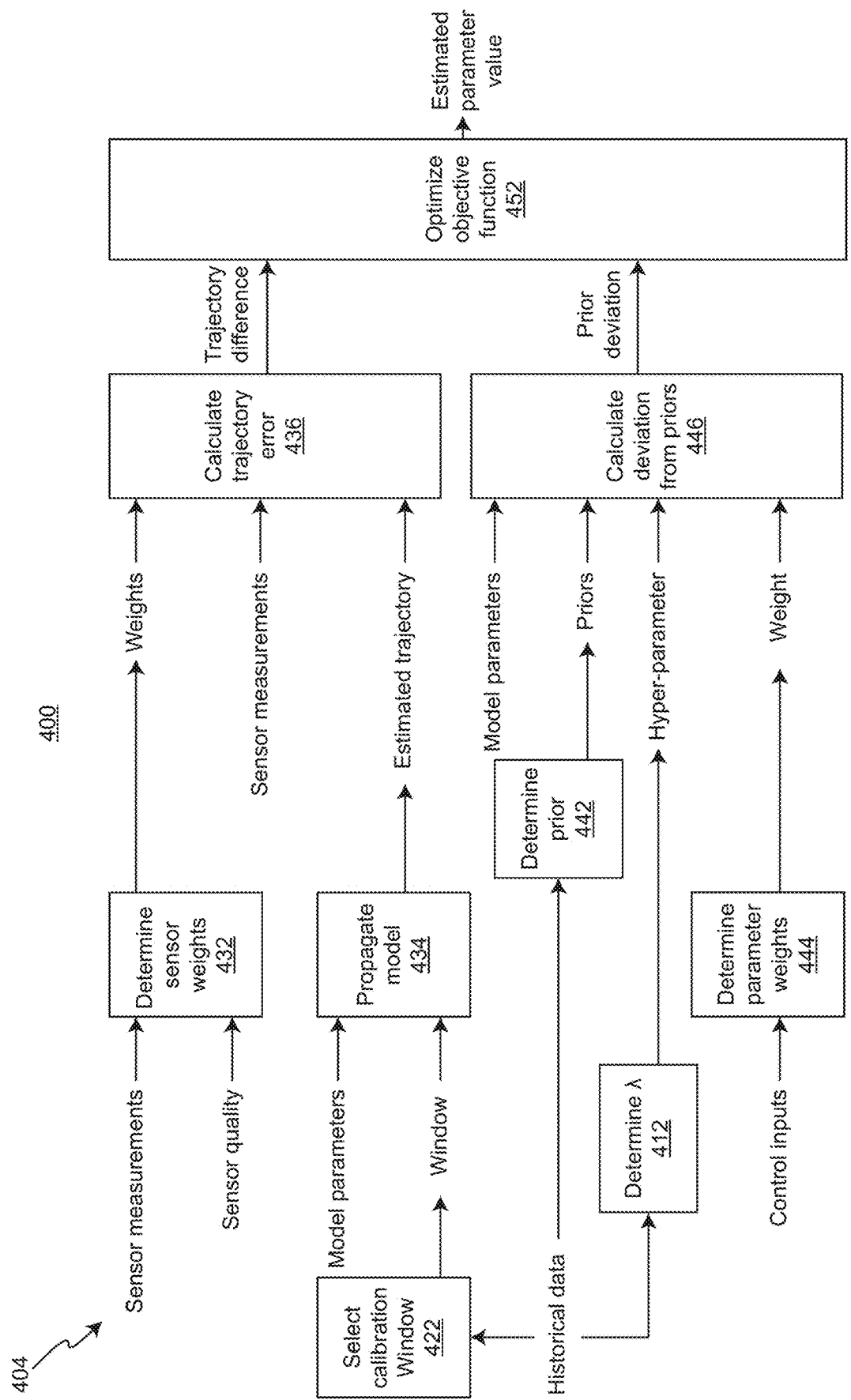

The memory 230 stores data, e.g., real time sensor measurements and historical data, that is needed in performing the proposed methodology, e.g., 300, 400 and 500 in FIGS. 3, 4 and 5, respectively. The memory 230 also store a series of instructions that when executed, causes the processor 210 to perform the proposed methodology using the BPM 212, the OF 214 and the TC 216. The memory 230 may be a conventional memory device such as flash memory, ROM, PROM, EPROM, EEPROM, DRAM, SRAM and etc.

FIG. 3 illustrates a flow diagram of an example of a method 300 for directional drilling. The method 300 can be used for controlling a directional drilling system (DDS), such as mud motors or rotary steerable systems, for directional drilling applications. A processor of a directional drilling advisory system (DDAS) such as 210 in FIG. 2 can perform the steps according to algorithms that correspond to the steps of the method 300. The algorithms can be represented as a series of operating instructions that direct the operation of one or more processors of the computing device when executed thereby. The method 300 starts at step 305.

At step 310, real time measurements are received. The real-time measurements may be received from various surface and/or downhole sensors, and may be in either time or depth domain. The measurements may indicate an attitude, such as an inclination and azimuth, curvature, such as dog leg severity (DLS), position, such as true vertical depth, north/south, east/west direction, and/or lithology such as gamma ray and resistivity of a borehole being drilled.

At step 320, historical data is received. The historical data may include sensor measurements, sensor quality, measurement uncertainty and control inputs from historical runs, prior knowledge of BPM parameters, hyper-parameters and DDS's behavior, data analytics of high-fidelity model and offset well, and etc. The data may be received from a storage device that is either internal, e.g., from a memory of the DDAS, or external, e.g., database or storage device is located external to the directional drilling system.

At step 330, using the measurements and data from steps 310 and 320, the dynamics/steering behavior of the DDS, which varies with the drilling progress, is updated in real-time. The dynamics of the DDS is updated by estimating parameters of a borehole propagation model (BPM) that maps the DDS's inputs to an output response. The parameters are estimated by optimizing an objective function, such as 214 in FIG. 2, which utilizes both the prior knowledge learned from the historical data and the real time measurements. Step 330 allows the BPM to provide a good prediction of the future state given a sequence of control input, which is essential in controlling a DDS and estimating current and future trajectory of a wellbore.

At step 340, future control inputs of the DDS are determined using the updated BPM and a trajectory controller. The found set of future control inputs, e.g., steering commands and/or operating parameters, are provided to the DDS at step 350. In addition or alternative to step 340, the updated BPM may be used to modify a configuration of a BHA. The method ends at step 355.

FIGS. 4A and B illustrate a flowchart 402 and a corresponding data flow diagram 404 of an example method 400 for estimating values of parameters of a BPM in real time. The method 400 is performed and repeated in real time, and uses an objective function to estimate values of BPM parameters based on all or a subset of real-time sensor measurements, control inputs, and historical data and knowledge learned therefrom. The method 400 may be performed as part of step 330 of FIG. 3. A processor of a directional drilling advisory system (DDAS) such as 210 in FIG. 2 can perform the steps according to algorithms that correspond to the steps of the method 400. The algorithms can be represented as a series of operating instructions that direct the operation of one or more processors of the computing device when executed thereby.

As mentioned above, a BPM describes the dynamics of a drilling tool/system by mapping its inputs to output response. The general form of the BPM in the depth domain can be presented as equation (1):

$$\dot{x}(\zeta) = f_s(x(\zeta), u(\zeta)) \quad (1)$$

wherein, $\zeta$ is the measured depth, whose value ranges from $D_{start}$ to $D_{end}$;

x is the state of the tool/system, which can be a function of attitude (inclination and azimuth) and curvature, position (true vertical depth, north/south, east/west direction); and/or lithology (gamma ray, resistivity).

u is the control input to the system, which can be a function of steering inputs (i.e., tool-face and duty cycle) and/or operating parameters (e.g., Weight On Bit (WOB), Rate Of Penetration (ROP), Revolution Per Minute (RPM), Flow Rate (FR));

$f_s$ is the function that describes the dynamics of the tool/system.

During the drilling operation, sensor measurements, which could be continuous or stationary, are often used as the feedback for the directional driller or the automated control system to make necessary adjustments or future steering decisions. In this method 400, values of parameters of a BPM are estimated by optimizing an objective function that describes the difference between a trajectory estimated from the BPM and feedback from the real time data and the deviation between the parameters and the prior knowledge of the parameters. For example, the objective function can be given by equation (2):

$$I(\vec{h}) = w_1 \cdot J_{means}(\vec{h}) + w_2 \cdot J_{prior\_dif}(\vec{h}) \quad (2)$$

where $\vec{h}$ is the vector consisting of values of the parameters; $w_1, w_2$ are the weighting factors of $J_{means}$, which indicates the difference between an estimated trajectory and downhole sensor measurements, and $J_{prior\_dif}$, which indicates the deviation of the parameters used to determine the estimated trajectory and the prior knowledge of the parameters. The method 400 may be performed by a processor in a directional drilling advisory system, such as 200 in FIG. 2.

The method 400 can be mainly divided into two stages, the first stage is formulating the objective function and the second stage is optimizing the objective function using any suitable optimization routine. The method 400 starts at step 405.

As a first step of formulating an objective function, some of the variables of the objective function are determined at step 410. Those variables include prior knowledge of the parameters (prior values in short), and hyper-parameters of the objective function, and they are determined based on the knowledge learned from historical data, such as those historical data received at step 320 of FIG. 3. The historical data may include the sensor measurements, sensor quality, measurement uncertainty and control inputs of one or a subset of historical runs, and/or data analytics of high-fidelity models and/or offset wells. Hyper parameter determination is shown in sequence 412 of the DFD 404.

It is understood that step 410 may be performed offline (while not drilling), e.g., before the method 400 starts. The results from step 410 compliment and provide extra information for the following steps but are not required for the method 400 to work. As such, when the historical data is not readily available and/or the real time measurements are reliable, step 410 can be omitted from the method 400.

As a second step of formulating the objective function, a length of calibration window is selected at step 420. The calibration window refers to a domain range, e.g., time or depth, of the received real time measurements, such as the real time downhole sensor measurements received at step 310 of FIG. 3. In the described example, the method 400 is in depth domain. The length of the calibration window may be selected based on the historical data such as the prior knowledge of the DDS's behavior and formation tendency, and/or desired control strategy/drilling objectives. Data flow of step 420 is shown in sequence 422 of the DFD 404.

It is understood that the length of the calibration window can be updated automatically if a change in the DDS's behavior is detected during the drilling operation. For example, if a given DDS is known for its fast reaction nature and the formation is known to vary drastically along the planned well path, the suitable control strategy might be to react to the change as quickly as possible. Thus, the calibration window can be selected to be short and automatically updated so it can capture the fast change of the drilling condition.

The second stage, which includes steps 430-450, optimizes the objective function. At step 430, a difference between an estimated trajectory and the real time sensor measurements is determined using the BPM. The difference here corresponds to $I_{meas}$ of the objective function, which represents a goodness of fit measure of estimated values of the parameters $\vec{h}$ to the sensor measurements observed within a measured depth window $[D_{start}, D_{end}]$. For example, the equation (3) can be used to calculate $I_{meas}$:

$$I_{meas}(\vec{h}) = \sum_{s=1}^{n} w_s \cdot \frac{1}{m} \sum_{i=1}^{m} \left(\tilde{\Theta}_i(\vec{h}) - \Theta_i^z\right)^2, \tag{3}$$

where $\tilde{\Theta}$ is the estimated attitude (inclination and azimuth) from the BPM with the estimated values of the parameters $\vec{h}$;
$\Theta$ is the observed measurement of a sensor;
m is the total number of available measurements of a sensor;
n is the total number of sensors whose measurements are used in the process;
$w_s$ is the weighting factor for each sensor.

To get a sequence of estimated attitudes $\tilde{\Theta}$, the BPM with the estimated values of the parameters $\vec{h}$ is first propagated with certain step size along the depth window $[D_{start}, D_{end}]$, during which a sequence of control input $u$, is applied, using equation (1). This is the model propagation process. Typically, a smaller step size provides finer estimation of the trajectory and but is more computationally expensive. It is suggested that the propagation step size is selected based on the frequency of the sensor measurements and computational power of the machine. Next, the estimated attitudes are interpolated such that for every observed sensor measurement, there is a corresponding estimated attitude at the same depth. This model propagation process is shown in sequence 434 of the DFD 404.

The weighting factors $w_z$ are used to assign certain weight to different sensors and can be determined based on several factors such as sensor quality, sensor distance to the bit, stationary or continuous measurements, etc. For example, the real-time measurements, whose sensor is located close to the bit, may be less reliable because it is more susceptible to being affected by vibrations. On the contrary, stationary surveys are much more reliable because the measurements are taken when the tool is not drilling, and the sensor is typically of higher quality so its weighting factor can have higher value. Additionally, the weight factors can be updated in real time to reflect the current drilling conditions such as sensor failures, drop in measurements quality due to being at different attitude, etc. This sensor weight determination is shown in sequence 432 of the DFD 450.

To summarize, the BPM is first propagated with the estimated value of the parameters, the control inputs, and the propagation step size to calculate the estimated trajectory of the borehole. The estimated trajectory is then compared to corresponding downhole sensor measurements and weighted to determine the difference there between. This determination represented as sequence 436 of the DFD 404.

At step 440, a deviation between the estimated values of the parameters and prior values of the parameters is determined. The deviation here corresponds to $I_{prior\text{-}dif}$ of the objective function representing a deviation between the estimated values of the parameters, i.e., parameters used to determine the estimated trajectory, and the prior knowledge of the parameters (prior in short). For example, equation (4) can be used to calculate $I_{prior\_dif}$:

$$I_{prior\_dif}(\vec{h}) = \lambda \sum_{j=1}^{p} w_j \cdot (h_j - \tilde{h}_i)^2, \tag{4}$$

where h is the estimated values of the parameters;
$\tilde{h}$ is the prior;
p is the total number of the parameters in the model;
w is the weighting factor for each parameter;
$\lambda$ is the hyper-parameter.

The prior $\tilde{h}_i$ can be obtained in several ways. The prior can be estimated from the historical data such as higher-fidelity physics-based model, knowledge of the DDS's behavior based on experience of the directional driller, formation information or offset wells analysis. The prior can also be estimated based on the estimated model parameter of previous iteration, e.g., previous depth window. In one example, the priors from these two processes can be combined, such as the prior estimated from the historical data may be updated after each iteration by taking an average or weighted average of the two. It is understood that updating the priors do not need to be performed once per iteration and can be done less frequently. But it is also understood that updating more often would require more computational power while providing more accurate model parameter estimation. The prior determination is shown in sequence 442 of the DFD 450.

There are two main factors in determining and updating the weighting factor $w_j$. The first one is the difference in the numerical range and unit of each parameter, and the weighting factor is adjusted to place the values of the parameters in a notionally common scale. This process is called normalization, and it reduces redundancies, resulting in less required computational power. For example, a min-max feature scaling method can be applied using the equation (5):

$$h' = a + \frac{(h - h_{min})(b - a)}{h_{max} - h_{min}}, \tag{5}$$

where h is the original value of the parameter; h' is the normalized value; $h_{min}$, $h_{max}$ are the minimum and maximum value of the parameter; and a, b are the minimum and maximum of the arbitrary range.

The second factor is related to how much information about a parameter during the calibration window is available. Different parameters of the model may indicate different aspects of the steering behavior of the system. So, depending on how much information is available for certain parameters during the calibration window, the weighting factor can be adjusted and updated accordingly. For example, if there is little information that can be used to estimate certain parameters, it can prevent those parameters from being updated. The parameter weight determination is shown in sequence 444 of the DFD 404.

Below is an example to illustrate the parameter updating scheme.

$$\dot{\theta} = K_s \cdot \mu \cdot \Sigma + K_r \cdot (1 - \Sigma) \quad (6)$$

The equation (6) is a borehole propagation (steering) model of a mud motor: where $\dot{\theta}$ is the resulting curvature generation; $K_s$ is the maximum dog leg severity (DLS) generation capability when sliding; $K_r$ is the maximum DLS generation capability when rotating; $\mu$ is the effective steering input which can be calculated by $\mu = \Sigma \cdot \cos(\Phi)$ for inclination plane or $\mu = \Sigma \cdot \sin(\Phi)$ for the pseudo azimuth plane; $\Phi$ is the average tool-face angle; and $\Sigma$ is the steering ratio. The $I_{prior\_dif}$ component of the objective function for the equation (6) can be calculated using equation (7):

$$I_{prior\_dif} = ((K_{si} - K_{si_{prior}})^2 + (K_{sa} - K_{sa_{prior}})^2) \cdot (1-\Sigma) + ((K_{ri} - K_{ri_{prior}})^2 + (K_{ra} - K_{ra_{prior}})^2) \cdot \Sigma \quad (7)$$

Here, the hyper-parameter $\lambda$, which is multiplied to the steering ratio but not shown, is 1; the steering ratio E is used to determine the weighting factors for updating $K_{si}$, $K_{sa}$, $K_{ri}$, $K_{ra}$, which are the maximum DLS generation capability when sliding and rotating for inclination and azimuth plane, respectively.

In this example, if the tool is in sliding mode for most of the stand, there would be good information to estimate the model parameters associated with sliding, which are $K_{si}$ and $K_{sa}$. Therefore, the weighting factors for these 2 terms are directly updated by the steering ratio. As such, another cost term $J_{inc-azi\_dif}$ can be calculated and added to the objective function using the following equations:

$$J_{inc\_azi\_dif} = \left( \|K_{si} - K_{sa}\| + \|K_{ri} - K_{ra}\| \cdot \frac{norm_s}{norm_r} \right) \cdot \frac{\|0.5 - \psi\|}{0.5} \quad (8)$$

$$\psi = \begin{cases} 0 & \Sigma = 0 \\ \cos^2(\Phi) & \Sigma > 0 \end{cases} \quad (9)$$

$$norm_r = \frac{1}{K_{r_{max}} - K_{r_{min}}} \quad (10)$$

$$norm_s = \frac{1}{K_{s_{max}} - K_{s_{min}}} \quad (11)$$

In the additional cost term $J_{inc\_azi\_dif}$, the rationale is to give more weight to the parameters associated with the attitude plane (inclination or azimuth), where the steering action is predominant. This is indicated by tool-face angle $\Phi$, from which $\psi$ is calculated. The 2 terms $norm_r$ and $norm_s$ are used to bring the values of $K_s$ and $K_r$ to a common scale.

To summarize, the priors are first obtained from the historical data and/or estimated values of the parameters from the previous iteration or calibration window. The priors are then normalized and weighted using the information available about the parameters, such as to their respective relation to the dominant steering action. Lastly, the priors are compared to the estimated values of the parameters to determine the deviation there between. This determination is represented as sequence 446 of the DFD 404.

Having the results of steps 430 and 440 as its components, the objective function is optimized using any suitable optimization process. This is shown as sequence 452 of the DFD 404. As a result of the optimization process, the estimated values of the parameters are found and the method 400 proceeds to end at step 455. The method 400 thus estimates values of the parameters that not only fit the real time measurements but also do not deviate from the expectation learned from the historical data.

It is understood that the parameter values found using the above method 400 are the average behavior of the DDS during the calibration window. In reality, the true model parameters may vary at different scales or window lengths; the estimation using a short window may yield different parameter values compared to one using a longer window. It is difficult to pinpoint the exact instance where the behavior changes and to represent each changing behavior with values of the parameters. One solution is to repeat the above method 400 using different window lengths and take a weighted average of the estimated value of the parameters.

For example, the method 400 may be repeated multiple times, with respect to different portions or subsets of the real-time downhole sensor measurements that correspond to different respective portions or sub lengths of the calibration window, to determine multiple sets of estimated values of the parameters. The method 400 then perform an additional step of taking weighted averages of these values. The estimated values can be weighted based on how recent the information being used to estimate the values is. In the current example, the parameters values estimated using the data within a calibration window of 50 ft from the bit have more weight than ones estimated using the data within a calibration window of 100 ft from the bit because they are estimated using more recent data.

It is also understood that history matching, both online and offline, the data to estimate the values of the parameters does not always guarantee the BPM can predict the future behavior. For example, if in a previous section of a run where the tool is operated at WOB of 20 klbs and the in the next section the WOB is planned to increase to 30 klbs to improve ROP, the BPM calibrated using only the data from WOB=20klbs section would not be able to accurately predict the behavior when WOB=301 kbs. One solution could be to include additional terms in the BPM to reflect the effect of WOB or a different model, data-based or physics-based or combination of both, that can interpolate or extrapolate the model parameters can be used in conjunction with the BPM. Using the equation (6) as an example, the model parameter Ksi is estimated to be 10 during a section when WOB is 20, $K_{si}$ is estimated to be 8 during a section when WOB is 25, $K_{si}$ is estimated as 6 during a section when WOB is 30. From these data, a very simple data-based model that describes the relationship between $K_{si}$ and WOB can be created and used in conduction with the BPM model to better predict the future behavior.

FIG. 5 illustrates a flow diagram of an example of a method 500 for determining a regularization hyper parameter. Hyper parameter is one of variables/components of an objective function that is used to estimate values of parameters for a BPM. Hyper parameter can be used to indicate some higher-level complexity of a BPM, or used as a setting for the BPM. For example, the hyper parameter $\lambda$ here is a setting that can be used to indicate how trustworthy the prior knowledge is.

A processor of a directional drilling advisory system (DDAS) such as 210 in FIG. 2 can perform the steps according to algorithms that correspond to the steps of the method 500. The algorithms can be represented as a series of operating instructions that direct the operation of one or more processors of the computing device when executed thereby.

In the illustrated method 500, hyper parameters are to be used with a BPM of equation (12):

$$\tau \cdot \frac{d^2\Theta(s)}{ds^2} = -\frac{d\Theta(s)}{ds} + K_{act} \cdot u(s) + K_{bias}, \quad (12)$$

where θ is the inclination angle; τ is the depth constant (similar to time constant); $K_{act}$ is the tool's maximum DLS generation capability; $K_{bias}$ represents the tool's steering tendency and any unaccounted forces on the system (e.g., formation push, unmodeled dynamics); and μ is the steering input.

The method 500 is an offline method that is performed while not drilling, such as before drilling, using historical data. The method 500 may be performed by a processor, such as 210 in FIG. 2. The method 500 starts at step 505.

At step 510, from historical data, such as a set of drilling runs that used similar BHA configurations or were in close proximity, are selected. It is understood that the rationale for selecting the set is not limited to the above and can include others.

At step 520, a window of data within a run is selected. This window can be selected based on a fixed depth window or based on a number of stationary surveys. At step 530, the available measurements are broken into separate data sets to be used for training and validating.

At step 540, the best fit values of the parameters are found using the training set. In this step, the best fit parameter values are estimated using data from the training set similar to the estimated parameter values in the method 400 above. For example, the best fit parameter values are found by estimating parameter values that provide a good fit to the data of the training set while not deviating much from the prior knowledge of the parameters.

The value of λ is selected from a set of λ values. Initially, the set of λ values may have a relatively wide range, e.g., λ=0, 0.01, 0.1, 1, 5, 10, 50, 100, 500, 1000. Later, when the range of λ can be narrowed down, the same process can be repeated to find a more refined λ value. λ is generally a positive arbitrary number but can be zero in some purely data-based BPMs.

At step 550, the root mean squared error (RMSE) of the training set is calculated. Using the best fit parameter values of step 540, the BPM is propagated within the depth window of the training set to find the estimated trajectory and calculate the root mean squared error (RSME) between the estimated trajectory and the stationary surveys:

$$RMSE_{train} = \sqrt{\frac{1}{s}\sum_{i=1}^{s}(\tilde{\Theta}_i(h) - \Theta_i)^2}, \quad (13)$$

when $\tilde{\Theta}$ is the estimated inclination from the model; Θ is the survey inclination; s is the total number of surveys within the window.

The calculation only uses the stationary surveys here because the continuous measurement quality and sensor bias may vary at different section of the runs and result in a magnified error unrelated to how accurate the estimation is. By using only reliable measurements, which is stationary surveys, measurements quality and sensor bias do not negatively affect the estimation process. Also during step 550, the RSME of the validation set is calculated similar to the training set.

It is understood that instead of RMSE, alternative measure of the difference such as mean absolute error (MAE), Median absolute error (MedAE), Mean absolute percentage error (MAPE) can be used for step 550.

At step 560, if there are more X values to try, the method 500 reverts back to step 540 so that steps 540-550 can be repeated for other values of λ until all values of λ are tried. At such time, the method 500 proceeds to step 570.

Figure 6:
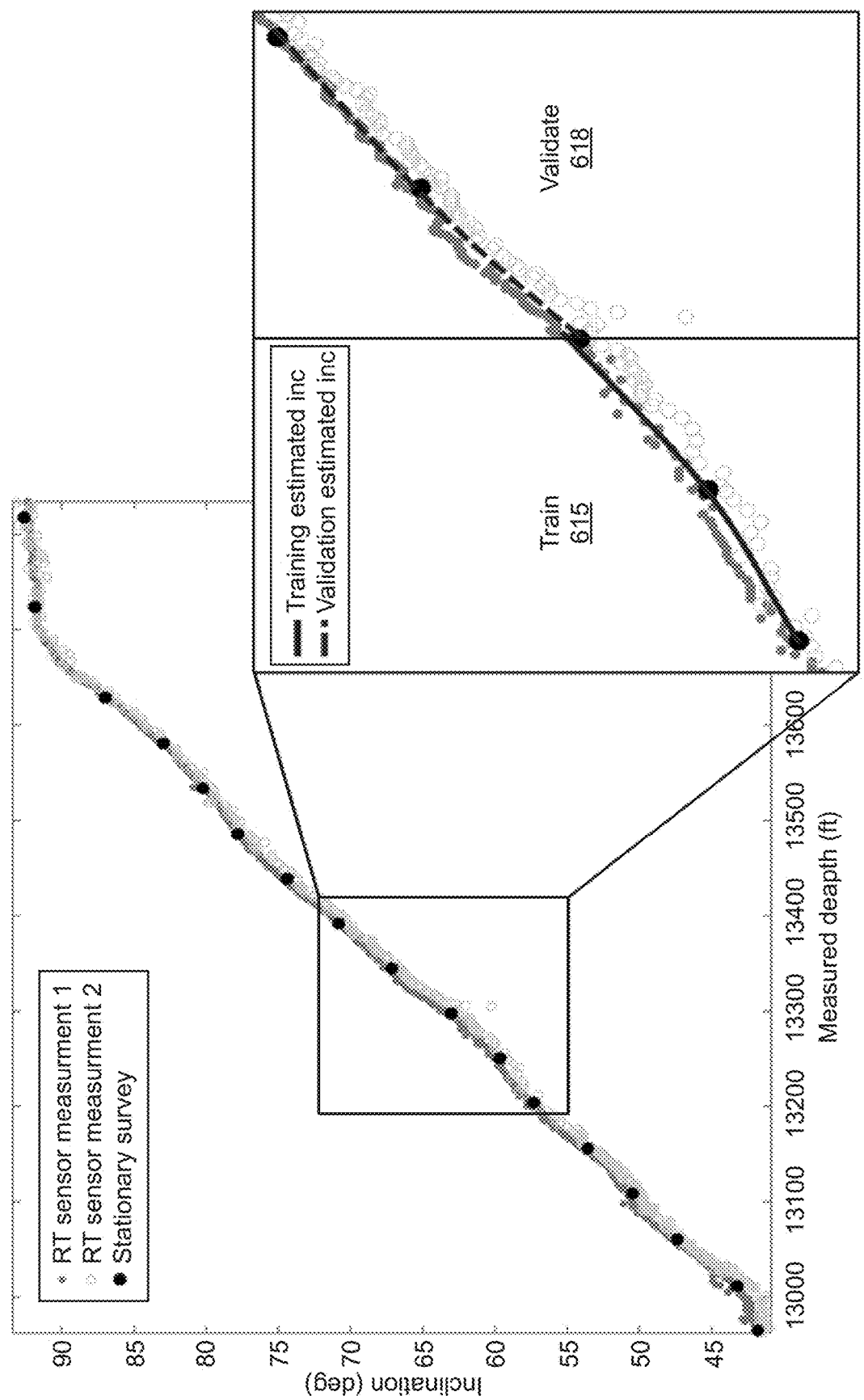
FIG. 6 is an example illustration of data set that may be used according to the principles of the current disclosure.

At step 570, the method 500 determines whether the current window is the last window of the selected run. If so, the method 500 proceeds to step 580, and if not, the method 500 reverts back to step 520 to select the next window of the selected run. When all the windows of the selected run have been propagated, the RSME values of the training and validation sets for each window and for each λ are saved for later analysis. FIG. 6 illustrates an exemplary set of data 600 used for the method 500 at the window and run level.

In the example shown in FIG. 6, the data within a window 610 of five stationary surveys is split into training 615 and validation data sets 618. The available data within the first three surveys are used to estimate the model parameters. Then, using the estimated parameters and the control inputs within the training set 615, the model is propagated to get the estimated inclination for the training set 615. Next, the estimated parameters and the control inputs within the validation set 618 are used to get the estimated inclination for validation set 618.

Back to FIG. 5, the method 500 determines whether the selected run is the last run of the set. If so, the method 500 proceeds to step 590, and if not, the method 500 reverts back to step 510 until all the runs in the set are evaluated.

At step 590, the results from all the runs in the set are combined, and the optimal value of λ is selected such that it results in a model whose physics-based and data-driven aspect are balanced. The method 500 ends at step 595.

Figure 7:
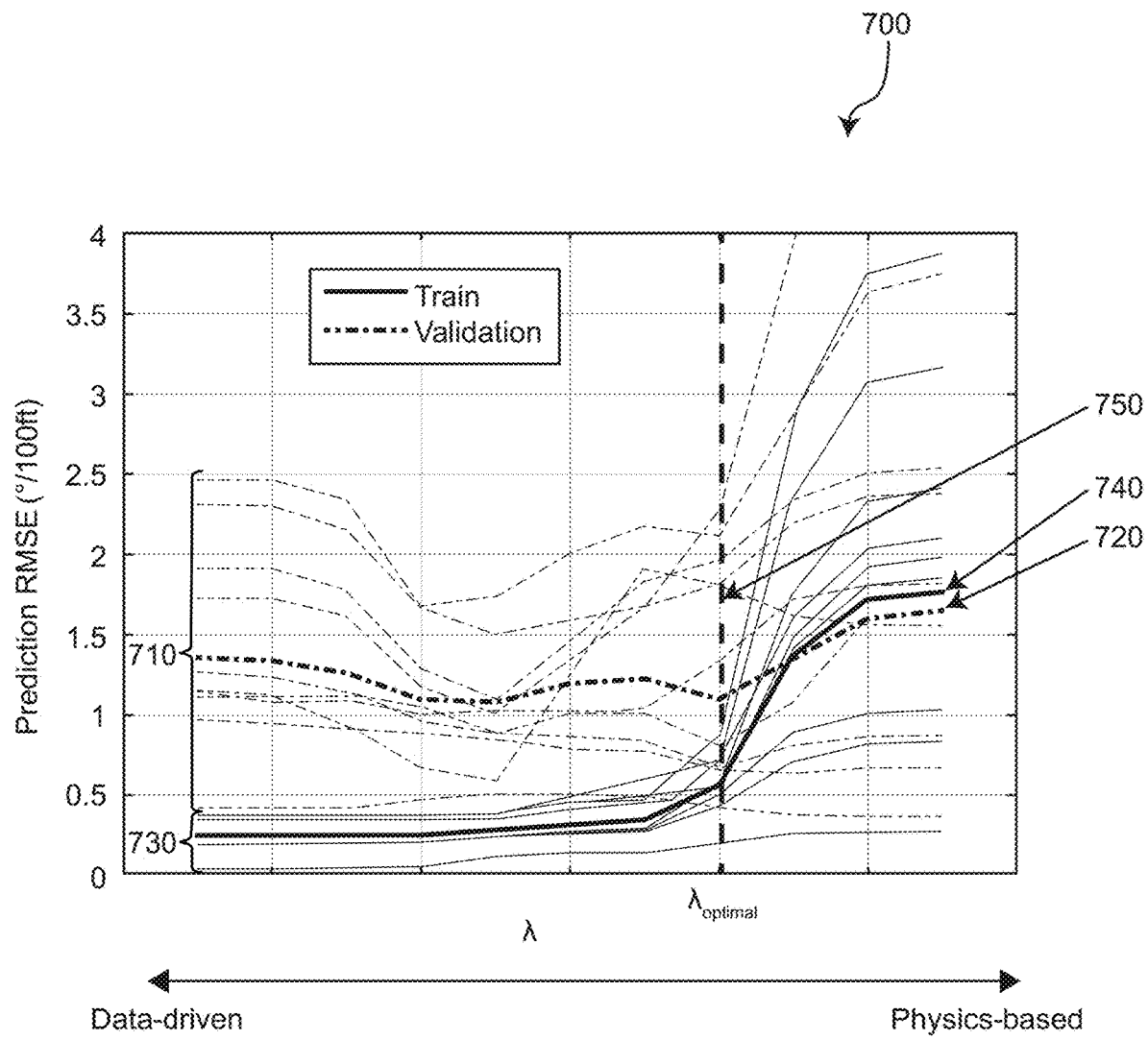
FIG. 7 is an example illustration of how an optimal value of $\lambda$ may be selected according to the principles of the current disclosure.

FIG. 7 illustrates how the optimal value of λ is selected 700 based on the results of multiple runs. In FIG. 7, line 710 represents the training error at the run level. This error is averaged from all the training windows of that run. Line 720 is the average training error from multiple runs. Similarly, line 730 and line 740 are the error from validation sets for single run and multiple runs, respectively. Here, the optimal value of λ is at the point 750 where both the training and validation error start to increase significantly, indicating under-fitting begins to happen.

Figure 8:
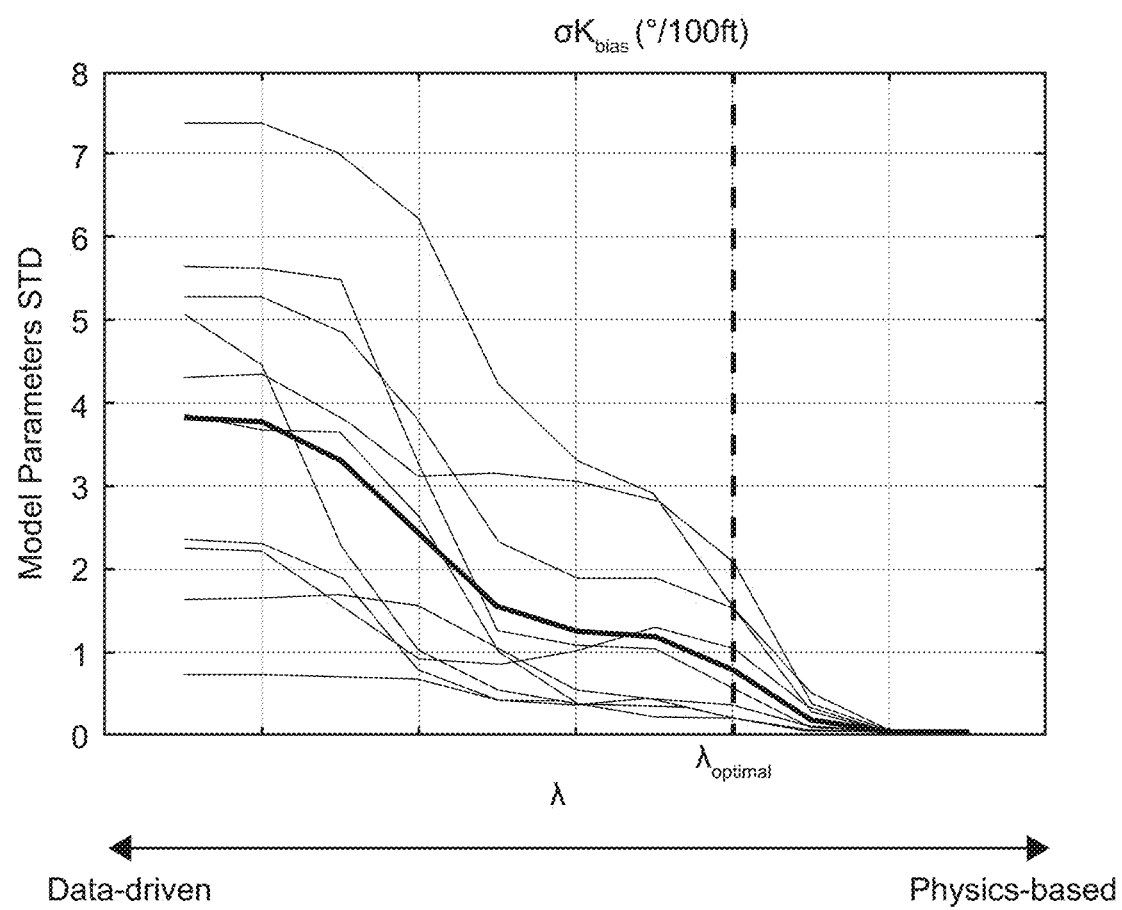
FIG. 8 is an example illustration of the effect of $\lambda$ on a fluctuation of a model parameter.

FIG. 8 illustrates the effect 800 of λ on the fluctuation of the model parameter. As the value of λ increases, the estimated model parameter is more stable and is closer to the prior value, which is based on the higher-fidelity physics-based model in this case. With smaller λ value, the parameter is allowed to vary in order to fit the data better, which results in more fluctuation, indicating by the high standard deviation.

A similar study for λ can be done using different subsets of runs of different tool configurations or regions. Different tools may have different ranges for the model parameters, and formation in different regions may result in specific noise characteristics. As such, different λ is needed for optimal estimation and control.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more processing units or processors. The processing unit may include one or more CPUs, one or more of other processor types, or a combination thereof. The digital data processors and computers can be located proximate each other, proximate a user, in the surface, downhole, or distributed in both the surface and downhole. For example, some components can be located proximate the user in the surface and some components can be located downhole, e.g., in BHA.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described examples. It is also to be understood that the terminology used herein is for the purpose of describing particular examples only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein. It is noted that as used herein and in the appended claims, the singular forms "a", "an", and "the" include plural referents unless the context clearly dictates otherwise.

Aspects disclosed herein includes:

A. A method for directional drilling that includes: calibrating a borehole propagation model (BPM) by estimating a value of at least one parameter of the BPM in real time based on historical data and real time sensor measurements; wherein said estimating includes optimizing an objective function that describes a difference between a trajectory estimated from the BPM and the real time sensor measurements and a deviation between the value of the at least one parameter and a prior value of the at least one parameter determined based on the historical data.

B. A system for directional drilling that includes: an interface that receives historical data and real time sensor measurements; and a processor that calibrates a borehole propagation model (BPM) by estimating a value of at least one parameter of the BPM in real time based on the historical data and the real time sensor measurements; wherein a processor that calibrates a borehole propagation model (BPM) by estimating a value of at least one parameter of the BPM in real time based on the historical data and the real time sensor measurements; wherein said estimating includes optimizing an objective function that describes a difference between a trajectory estimated from the BPM and the real time sensor measurements and a deviation between the value of the at least one parameter and a prior value of the at least one parameter determined based on the historical data.

C. A computer program product having a series of operating instructions stored on a non-transitory computer-readable medium that directs a data processing apparatus when executed thereby to: calibrate a borehole propagation model (BPM) by estimating a value of at least one parameter of the BPM in real time based on historical data and real time sensor measurements; wherein said estimating includes optimizing an objective function that describes a difference between a trajectory estimated from the BPM and the real time sensor measurements and a deviation between the value of the at least one parameter and a prior value of the at least one parameter determined based on the historical data.

Each of aspects A, B, and C can have one or more of the following additional elements in combination. Element 1: providing the calibrated BPM to a trajectory controller for determining future control inputs of a directional drilling system (DDS). Element 2: modify a configuration of a bottomhole assembly using the calibrated BPM. Element 3: receiving the historical data. Element 4: receiving the real time data from surface and/or downhole sensors. Element 5: the real time sensor measurements are in either a time or depth domain. Element 6: determining an optimal hyper parameter value of the objective function from the historical data. Element 7: said determining the hyper parameter value includes selecting one of historical runs from the historical data, selecting one of data windows within the selected historical run, breaking available measurements within the window into multiple data sets, finding best fit parameter values for each of the multiple data sets using one of predefined hyper parameter values, and calculating a measure of difference between the best fit parameter value and a corresponding stationary measurement for the each data set. Element 8: the historical runs share either a similar BHA configuration or location. Element 9: said finding and said calculating are repeated until all of the predefined hyper parameter values are used. Element 10: said selecting one data window, said breaking, said finding and said calculating are repeated until all of the data windows are selected. Element 11: said selecting one historical run, said selecting one data window, said breaking, said finding and said calculating are repeated until all or a subset of the historical runs are selected. Element 12: determining the optimal value of the hyper parameter based on results from the all or a subset of historical runs. Element 13: selecting a length of a calibration window of the real time sensor measurements based at least in part on a knowledge learned from the historical data and desired control strategy. Element 14: detecting a change in a DDS's behavior and upon said detecting, automatically updating the length of the calibration window based the change. Element 15: the real time sensor measurements are observed within the calibration window of the real time sensor measurements. Element 16: said estimating includes taking an weighted average of multiple estimated values of the at least one parameter, and the multiple estimated values are estimated using different subset of the real time sensor measurements that correspond to different sub-lengths of the calibration window. Element 17: said optimizing the objective function includes selecting a propagation step size based on a frequency of the real time sensor measurements and a computational power of a processor propagating the BPM. Element 18: said optimizing the objective function includes estimating the trajectory by propagating the BPM with the value of the at least one parameter at the each step size along the calibration window of the real time sensor measurements while applying a sequence of control inputs. Element 19: said optimizing the objective function includes interpolating the trajectory to correspond to the real time sensor measurements. Element 20: said optimizing the objective function includes weighting the real time sensor measurements based at least in part on current drilling condition, a sensor quality, and a sensor distance to a bit. Element 21: said optimizing the objective function includes determining the prior value based on a knowledge learned from the historical data. Element 22: said optimizing the objective function includes determining the prior value by taking an weighted average of first and second prior values of the at least one parameter, wherein the first prior value is based on a knowledge learned from the historical data and the second prior value is based on an estimated value of the at least one parameter from a previous calibration window. Element 23: said optimizing the objective function includes determining a weighting factor of the at least one parameter based on an amount of information available about the at least one parameter during the measured depth or time window. Element 24: the information available about the at least one parameter includes a steering action that is associated with the at least one parameter, and an attitude plane where the steering action is predominant. Element 25: said determining the weighting factor includes normalizing values of all parameters of the BPM. Element 26: the processor determines future control inputs of a directional drilling system (DDS) using the calibrated BPM. Element 27: a configuration of a bottomhole assembly is modified using the calibrated BPM. Element 28: a memory that stores the historical data received from a database. Element 29: the real time data is received from surface and/or downhole sensors. Element 30: the processor determines an optimal hyper parameter value of the objective function from the historical data. Element 31: the processor determines the hyper parameter value by selecting one of historical runs from the historical data, selecting one of data windows within the selected historical run, breaking available measurements within the window into multiple data sets, finding best fit parameter value for each of the multiple data sets using one of predefined hyper parameter values, and calculating a measure of difference between the best fit parameter value and a corresponding stationary measurement for the each data set. Element 32: the processor repeats said finding and said calculating until all of the predefined hyper parameters are used. Element 33: the processor repeats said selecting one data window, said breaking, said finding and said calculating until all of the data windows are selected. Element 34: the processor repeats said selecting one historical run, said selecting one data window, said breaking, said finding and said calculating until all or a subset of the historical runs are selected. Element 35: the processor determines the optimal value of the hyper parameter based on results from the all or subset of historical runs. Element 36: the processor selects a length of a calibration window of the real time sensor measurements based at least in part on a knowledge learned from the historical data and desired control strategy. Element 37: the processor detects a change in a DDS's behavior and upon said detecting, automatically updates the length of the calibration window based the change.

What is claimed is:

1. A method for directional drilling, comprising:
calibrating a borehole propagation model (BPM) by estimating a value of at least one parameter of the BPM in real time based on historical data and real time sensor measurements, wherein the estimating includes optimizing an objective function that describes a difference between a trajectory estimated from the BPM and the real time sensor measurements and a deviation between the value of the at least one parameter and a prior value of the at least one parameter determined based on the historical data, wherein the optimizing the objective function includes determining a weighting factor of the at least one parameter based on an amount of information available about the at least one parameter during a calibration, and the information available about the at least one parameter includes a steering action that is associated with the at least one parameter and an attitude plane where the steering action is predominant; and
providing the calibrated BPM to a trajectory controller for determining future control inputs of a directional drilling system, wherein the directional drilling system steers a drill bit based on the future control inputs to bring the drill bit back to a planned trajectory of the borehole.

2. The method of claim 1, further comprising determining an optimal hyper parameter value of the objective function from the historical data by:
selecting one of a plurality of historical runs from the historical data;
selecting one of a plurality of data windows within the selected historical run;
breaking available measurements within the window into multiple data sets;
finding best fit parameter values for each of the multiple data sets using one of a plurality of predefined hyper parameter values; and
calculating a measure of difference between the best fit parameter value and a corresponding stationary measurement for each data set of the multiple data sets.

3. The method of claim 2, wherein said finding and said calculating are repeated until all of the predefined hyper parameter values are used, and said selecting one data window, said breaking, said finding and said calculating are repeated until all of the data windows are selected.

4. The method of claim 3, wherein said selecting one historical run, said selecting one data window, said breaking, said finding and said calculating are repeated until all or a subset of the historical runs are selected.

5. The method of claim 1, further comprising selecting a length of a calibration window of the real time sensor measurements based at least in part on a knowledge learned from the historical data and a desired control strategy.

6. The method of claim 5, further comprising:
detecting a change in a directional drilling system's behavior; and
upon said detecting, automatically updating the length of the calibration window based on the change.

7. The method of claim 5, wherein said optimizing the objective function includes:
selecting a propagation step size based on a frequency of the real time sensor measurements and a computational power of a processor propagating the BPM; and
estimating the trajectory by propagating the BPM with the value of the at least one parameter at each propagation step size along the calibration window of the real time sensor measurements while applying a sequence of control inputs.

8. The method of claim 1, wherein said optimizing the objective function includes weighting the real time sensor measurements based at least in part on a current drilling condition, a sensor quality, and a sensor distance to a bit.

9. The method of claim 1, wherein said optimizing the objective function includes determining the prior value based on a knowledge learned from the historical data.

10. A system for directional drilling, comprising:
an interface that receives historical data and real time sensor measurements; and
a processor that calibrates a borehole propagation model (BPM) by estimating a value of at least one parameter of the BPM in real time based on the historical data and the real time sensor measurements;
wherein:
the estimating includes optimizing an objective function that describes a difference between a trajectory estimated from the BPM and the real time sensor measurements and a deviation between the value of the at least one parameter and a prior value of the at least one parameter determined based on the historical data, wherein the optimizing the objective function includes determining a weighting factor of the at least one parameter based on an amount of information available about the at least one parameter during a calibration window, and the information available about the at least one parameter includes a steering action that is associated with the at least one parameter and an attitude plane where the steering action is predominant; and
the processor determines future control inputs of a directional drilling system (DDS) using the calibrated BPM, wherein the DDS steers a drill bit back to a planned trajectory of the borehole based on the future control inputs.

11. The system of claim 10, further comprising a memory that stores the historical data received from a database.

12. The system of claim 10, wherein the processor determines an optimal hyper parameter value of the objective function from the historical data by:
selecting one of a plurality of historical runs from the historical data;
selecting one of a plurality of data windows within the selected historical run;
breaking available measurements within the window into multiple data sets;
finding best fit parameter value for each of the multiple data sets using one of a plurality of predefined hyper parameter values; and
calculating a measure of difference between the best fit parameter value and a corresponding stationary measurement for each data set of the multiple data sets.

13. The system of claim 12, wherein the processor repeats said finding and said calculating until all of the predefined hyper parameters are used, and repeats said selecting one data window, said breaking, said finding and said calculating until all of the data windows are selected.

14. The system of claim 13, wherein the processor repeats said selecting one historical run, said selecting one data window, said breaking, said finding and said calculating until all or a subset of the historical runs are selected.

15. The system of claim 10, wherein the processor selects a length of a calibration window of the real time sensor measurements based at least in part on a knowledge learned from the historical data and a desired control strategy.

16. The system of claim 15, wherein the processor detects a change in a directional drilling system's behavior and upon said detecting, automatically updates the length of the calibration window based on the change.

17. The system of claim 15, wherein said optimizing the objective function includes:
selecting a propagation step size based on a frequency of the real time sensor measurements and a computational power of the processor; and
estimating the trajectory by propagating the BPM with the value of the at least one parameter at each propagation step size along the calibration window of the real time sensor measurements while applying a sequence of control inputs.

18. The system of claim 10, wherein said optimizing the objective function includes weighting the real time sensor measurements based on a current drilling condition, a sensor quality, a sensor distance to a bit.

19. The system of claim 10, wherein said optimizing the objective function includes determining the prior value based on a knowledge learned from the historical data.

20. A computer program product having a series of operating instructions stored on a non-transitory computer-readable medium that directs a data processing apparatus when executed thereby to:
calibrate a borehole propagation model (BPM) by estimating a value of at least one parameter of the BPM in real time based on historical data and real time sensor measurements, wherein the estimating includes optimizing an objective function that describes a difference between a trajectory estimated from the BPM and the real time sensor measurements and a deviation between the value of the at least one parameter and a prior value of the at least one parameter determined based on the historical data, wherein the optimizing the objective function includes determining a weighting factor of the at least one parameter based on an amount of information available about the at least one parameter during a calibration, and the information available about the at least one parameter includes a steering action that is associated with the at least one parameter and an attitude plane where the steering action is predominant; and
provide the calibrated BPM to a trajectory controller for determining future control inputs of a directional drilling system, wherein the directional drilling system steers a drill bit based on the future control inputs to bring the drill bit back to a planned trajectory of the borehole.

\* \* \* \* \*

UNITED STATES PATENT AND TRADEMARK OFFICE
CERTIFICATE OF CORRECTION

PATENT NO. : 12,012,840 B2
APPLICATION NO. : 17/564578
DATED : June 18, 2024
INVENTOR(S) : Vy Pho et al.

It is certified that error appears in the above-identified patent and that said Letters Patent is hereby corrected as shown below:

In the Specification

In Column 7, Line 19, after --here corresponds-- delete "$I_{meas}$" and insert --$J_{meas}$--

In Column 7, Line 23, after --used to calculate-- delete "$I_{meas}$" and insert --$J_{meas}$--

In Column 7, Line 26-28, delete Equation 3 " $I_{meas}(\vec{h}) = \sum_{s=1}^{n} w_s \cdot \frac{1}{m} \sum_{i=1}^{m} (\widetilde{\Theta}_i(\vec{h}) - \Theta_i^s)^2$ (3), " and insert -- $J_{meas}(\vec{h}) = \sum_{s=1}^{n} w_s \cdot \frac{1}{m} \sum_{i=1}^{m} (\widetilde{\Theta}_i(\vec{h}) - \Theta_i^s)^2$ (3), --

In Column 8, Line 28, after --The prior-- delete "$\bar{h}_i$" and insert --$\bar{h}_j$--

In Column 9, Line 8, delete "$\dot{\theta} = K_s \cdot \mu \cdot \Sigma + K_r \cdot (1 - \Sigma)$" and insert --$\dot{\theta} = K_s \cdot u \cdot \Sigma + K_r \cdot (1 - \Sigma)$--

Signed and Sealed this
Sixteenth Day of September, 2025

Coke Morgan Stewart
*Acting Director of the United States Patent and Trademark Office*